United States Patent
Stevens et al.

(10) Patent No.: US 9,141,506 B2
(45) Date of Patent: Sep. 22, 2015

(54) METHOD AND SYSTEM FOR NETWORK MONITORING USING SIGNATURE PACKETS

(71) Applicant: JDS Uniphase Corporation, Milpitas, CA (US)

(72) Inventors: Michael Stevens, Fountain, CO (US); Robert D'Eletto, Highlands Ranch, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 253 days.

(21) Appl. No.: 13/768,846

(22) Filed: Feb. 15, 2013

(65) Prior Publication Data

US 2013/0212439 A1    Aug. 15, 2013

Related U.S. Application Data

(60) Provisional application No. 61/599,284, filed on Feb. 15, 2012.

(51) Int. Cl.
| | | |
|---|---|---|
| *G06F 11/00* | (2006.01) | |
| *G06F 11/30* | (2006.01) | |
| *H04L 12/26* | (2006.01) | |
| *H04L 29/06* | (2006.01) | |

(52) U.S. Cl.
CPC .......... *G06F 11/3065* (2013.01); *H04L 43/028* (2013.01); *H04L 43/12* (2013.01); *H04L 63/1416* (2013.01)

(58) Field of Classification Search
CPC ....................................................... H04L 1/00
See application file for complete search history.

(56) References Cited

U.S. PATENT DOCUMENTS

| | | | |
|---|---|---|---|
| 5,185,860 A | 2/1993 | Wu | 709/224 |
| 6,108,782 A | 8/2000 | Fletcher et al. | 713/153 |
| 6,286,039 B1 | 9/2001 | Van Horne et al. | 709/221 |
| 7,299,277 B1 | 11/2007 | Moran et al. | 709/224 |
| 7,336,673 B2 | 2/2008 | Ilnicki et al. | 370/412 |
| 7,337,233 B2 | 2/2008 | Dillon | 709/322 |
| 7,506,065 B2 | 3/2009 | LaVigne et al. | 709/245 |
| 7,583,587 B2 * | 9/2009 | Qiu et al. | 370/216 |
| 7,633,944 B1 * | 12/2009 | Chang et al. | 370/392 |

(Continued)

FOREIGN PATENT DOCUMENTS

| | | | |
|---|---|---|---|
| GB | 2 371 442 | 7/2002 | H04L 12/26 |
| GB | 2426145 | 11/2006 | H04L 12/26 |

(Continued)

OTHER PUBLICATIONS

Search report for corresponding EP application No. 13155385.1.

(Continued)

*Primary Examiner* — Amine Riad
(74) *Attorney, Agent, or Firm* — Matthew A. Paquignot; Pequignot & Myers LLC

(57) ABSTRACT

A method of monitoring a network with a test device connected to the network includes monitoring a plurality of packets which pass through the test device, comparing a predefined field of each of the plurality of packets to a predefined pattern so as to identify signature packets, evaluating whether the signature packets satisfy a predefined condition, and, if the predefined condition is satisfied, sending a notification to a user. A system implementing the method is provided.

6 Claims, 5 Drawing Sheets

(56) References Cited

U.S. PATENT DOCUMENTS

| | | | |
|---|---|---|---|
| 7,688,754 B2 | 3/2010 | Williams | 370/253 |
| 7,733,773 B2 | 6/2010 | Wager et al. | 370/230 |
| 7,797,406 B2 * | 9/2010 | Patel et al. | 709/220 |
| 7,804,832 B2 | 9/2010 | Andrews et al. | 370/390 |
| 7,827,256 B2 * | 11/2010 | Phillips et al. | 709/220 |
| 8,125,897 B2 * | 2/2012 | Ray et al. | 370/229 |
| 2001/0039579 A1 | 11/2001 | Trcka et al. | 709/224 |
| 2003/0223376 A1 | 12/2003 | Elliott et al. | 370/249 |
| 2004/0001443 A1 | 1/2004 | Soon et al. | 370/244 |
| 2004/0083299 A1 * | 4/2004 | Dietz et al. | 709/230 |
| 2004/0208129 A1 | 10/2004 | Old et al. | 370/241 |
| 2006/0259966 A1 * | 11/2006 | Ilnicki | 726/22 |
| 2007/0006292 A1 | 1/2007 | Jaenicke | 726/11 |
| 2008/0010278 A1 * | 1/2008 | Kencl et al. | 707/6 |
| 2008/0285452 A1 | 11/2008 | Oran | 370/235 |
| 2011/0158240 A1 | 6/2011 | Sun et al. | 370/392 |
| 2012/0250519 A1 | 10/2012 | Stevens et al. | 370/241 |
| 2014/0177465 A1 * | 6/2014 | Scott et al. | 370/252 |

FOREIGN PATENT DOCUMENTS

| | | | |
|---|---|---|---|
| WO | 2005111805 | 11/2005 | G06F 11/30 |
| WO | 2009001067 | 12/2008 | H04L 12/26 |

OTHER PUBLICATIONS

Enns et al., "Device Discovery Protocol (DDP) draft-marques-ddp-00.txt; draft-marques-ddp-00.txt", IETF Standard-Working-Draft, Internet Engineering Task Force, IETF, CH, May 2003.

Claise et al., "Packet Sampling (PSAMP) Protocol Specifications; rfc5476.txt", Packet Sampling (PSAMP) Protocol Specification; RFC5476 TXT, Internet Engineering Task Force, IETF; Standard, Internet Society (ISOC) 4, Rue Des Falaises CH—1205 Geneva, Switzerland, Mar. 1, 2009, XP015065545.

Kaeo et al., "Methodology for Benchmarking IPsec Devices; draft-ietf-bmwg-ipsec-met h-05.txt", Methodology for Benchmarking IPSEC Devices; draft-ietf-bmwg-ipsec-met h-05.txt, Internet Engineering Task Force, IETF; Standardworkingdraft, Internet Society (ISOC) 4, Rue Des Falaises CH—1205 Geneva, Switzerland, vol. bmwg, No. 5, Jul. 28, 2009, XP015063661.

\* cited by examiner

METHOD AND SYSTEM FOR NETWORK MONITORING USING SIGNATURE PACKETS

CROSS-REFERENCE TO RELATED APPLICATIONS

The present application claims priority from U.S. Provisional Patent Application No. 61/599,284 filed Feb. 15, 2012, incorporated herein by reference.

TECHNICAL FIELD

The present invention relates generally to networking and communications technology and, more particularly, to methods and systems for network monitoring.

BACKGROUND OF THE INVENTION

Communication networks are widely used today; the variety of networks includes the Internet, wide-area networks (WANs), local-area networks (LANs), telephony networks, and wireless networks. The importance of network monitoring and testing is growing as well as the requirements for related methods and equipment.

Monitoring devices may be implemented within a network for monitoring communication along such network. The monitoring devices are referred to as "eavesdropping devices" or "passive probes" because they are generally not a party to the communication but are instead monitoring such communication for some reason, such as for performance monitoring of the network, testing, and/or other reasons. Conventional devices for analyzing traffic packets may be attached directly to a monitor port or passive network tap at a switch or element.

Conventional monitoring systems notify an operator after a problem has already occurred, e.g. when traffic along a particular link has ceased. However, the network traffic contains patterns which may help identifying an issue before a customer or service provider become aware of the problem.

Accordingly, there is a need to mitigate the disadvantages of existing systems and methods and to provide a novel method and a system for network monitoring. In particular, a need exists for a system and method which would notify a user about undesirable patterns in the network traffic.

SUMMARY OF THE INVENTION

A method of monitoring a network with a test device connected to the network includes monitoring a plurality of packets which pass through the test device, comparing a predefined field of each of the plurality of packets to a predefined pattern so as to identify signature packets, evaluating whether the signature packets satisfy a predefined condition, and, if the predefined condition is satisfied, sending a notification to a user. A system implementing the method is provided.

A system is provided which includes at least two sensors and a monitoring manager. Each of the sensors is programmed to capture a plurality of packets passing therethrough. The monitoring manager is programmed to send a notification to a user. The system is programmed to (a) compare a predefined field of each of the plurality of packets to a predefined pattern stored in a tangible memory so as to identify signature packets, (b) evaluate whether the signature packets satisfy a predefined condition, and, (c) send the notification if the predefined condition is satisfied. The sensors may be programmed to perform steps (a) and (b), or the monitoring manager may be programmed to perform steps (a) and (b), or the sensors may be programmed to perform step (a) and the monitoring manager—to perform step (b).

BRIEF DESCRIPTION OF THE DRAWINGS

The invention will be described in greater detail with reference to the accompanying drawings which represent preferred embodiments thereof, wherein.

DETAILED DESCRIPTION

According to the method disclosed herein, a monitoring system which includes traffic monitoring sensors may be used for notifying a provider of what is happening and will happen in their network. The network monitoring devices may collect traffic signatures in the form of data packets of certain types and then use predefined rules to provide information about the network; this may lead to discovery of customer issues that was not possible before. The method allows using traffic signatures along with the rules to present an indicator of these issues. With the data collection devices within the network and a signature engine, the monitoring system can provide additional value to the customer. The system collects packets of a certain type (a signature), then combines one or more signatures with a corresponding rule so as to identify certain conditions to a user.

By way of example, a signature may be based on packets compliant to Dynamic Host Configuration Protocol (DHCP) that is conventionally employed to configure network devices so that they can communicate on an IP network. The configuration process involves clients and a server operating in a client-server model, wherein personal computers are clients and a router is the server. The clients request configuration settings using the DHCP protocol. In particular, the server provides a client with a dynamic IP address, which needs to be regularly renewed. A network monitoring system may monitor DHCP renewal messages and proactively inform the service provider when a customer is having an issue before the customer becomes aware of it.

Figure 1:
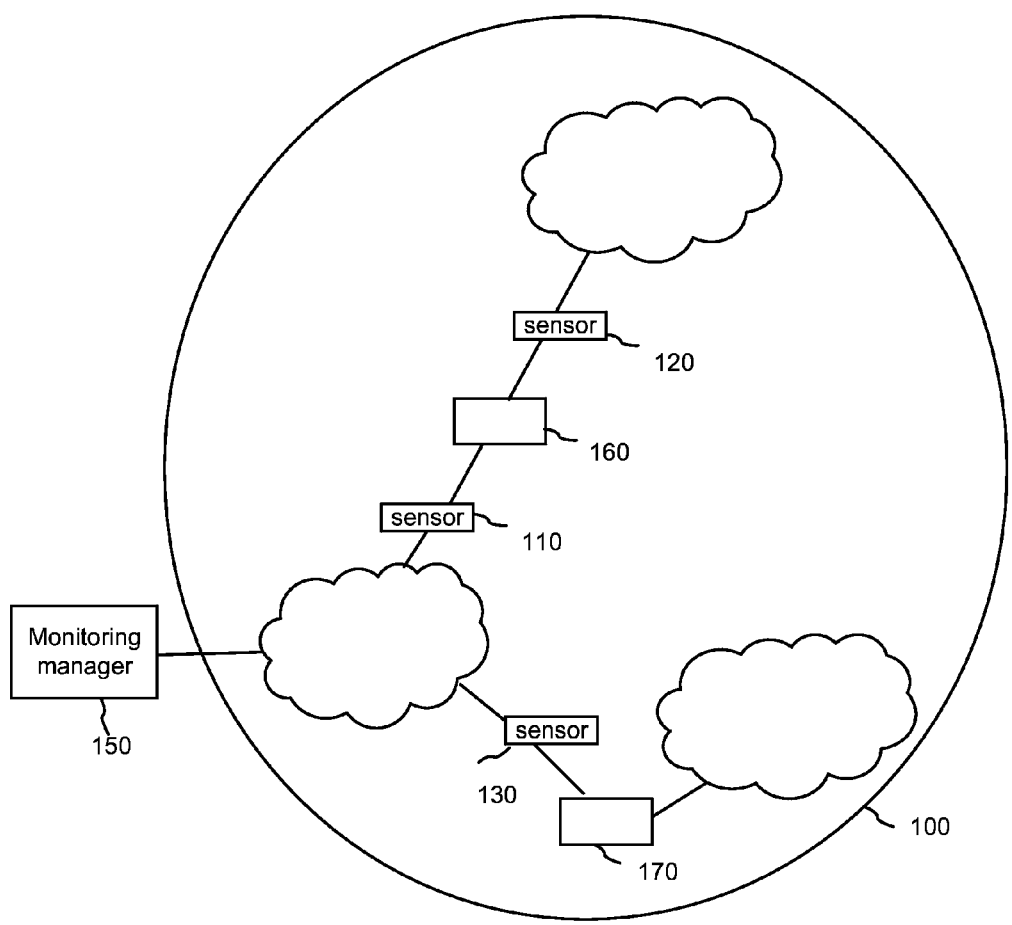
FIG. 1 is a schematic diagram of a test system.

A plurality of devices may be disposed in a network for monitoring communication along the network. Monitoring sensors may be attached directly to a port or passive network tap at a switch or element; the devices are generally referred to as sensors or probes. With reference to FIG. 1, a plurality of sensors including sensors 110, 120, and 130 are provided for monitoring a network 100 which includes nodes 160 and 170. Together with a monitoring manager 150, the sensors form a network monitoring system.

The communication network 100 may be any type of packet network, currently known or later developed, including the Internet, WAN, LAN, Multi-label Packet Switching (MPLS) networks, telephony networks, wireless networks, optical networks, and any combination of the foregoing. Preferably, the communication network 100 is a packet-switched network or any type of network that uses addressing for packet, cell or frame delivery. Such networks include, but are not limited to, Asynchronous Transfer Mode (ATM) networks, Frame Relay networks, Hybrid fiber-coaxial (HFC)

networks, and Synchronous Optical Network/Synchronous Digital Hierarchy (SONET/SDH) networks. The current design is for packet based networks, but the invention could be useful in other kinds of networks. Accordingly, the term "packet" should be understood as including conventional packets, such as IP and Ethernet packets, as well as cells and frames.

Figure 2:
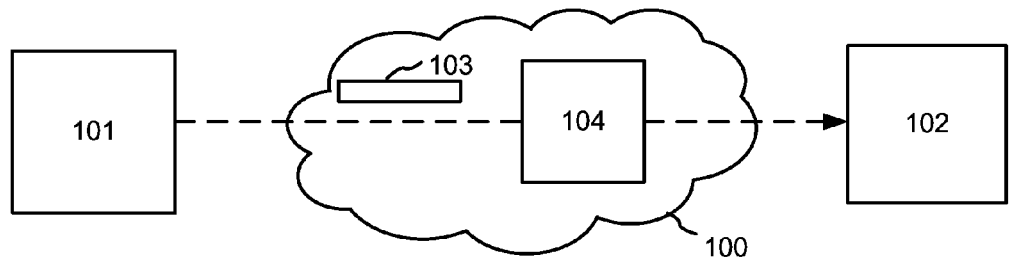
FIG. 2 is a schematic diagram of a test device connected inline in a network.

With reference to FIG. 2, a test device (sensor) 104, which represents the sensors shown in FIG. 1, is connected inline in the network 100 so that packets passing between at least two devices on the network, in this case between a data source device 101 and a destination device 102, pass through the test device 104. The test device 104 implements a method of network testing, which may include passive monitoring, active testing, or a combination of both, as well as testing a subnetwork, link, or a device. By way of example, the test device 104 may be a transceiver plugged into a network device, which is another device with respect to the transceiver.

The test device 104 may be a protocol-generic test device employed in the communication network 100 for monitoring packets sent across the network 100, such as a packet 103 being communicated in this illustrative example from the source 101 to the destination 102.

While only two devices 101 and 102 are shown as communicatively coupled via the communication network 100 in FIG. 2, it should be understood that any number of devices may be so connected. Further, while the device 101 is indicated as a source and the device 102—as a destination, it will be appreciated that communication may be bi-directional such that in some instances the device 102 is a source and the device 101 is a destination.

The test device (sensor) 104 is connected inline in the network 100 and is capable of inspecting and/or capturing packets which travel from the source 101 to the destination 102, and examining the received packets. In the example shown in FIG. 2, the packet 103 travels from the source 101 to the destination 102 and is intercepted by the test device 104.

The test device 104 may examine received packets (or their copies) exemplified by the packet 103 in FIG. 2. If the packet 103 is not intended to the test device 104, the packet 103 is forwarded to the destination address of the packet without any change to the packet 103. However, the packet 103 may be copied and forwarded to the monitoring manager 150 as discussed further.

Figure 3:
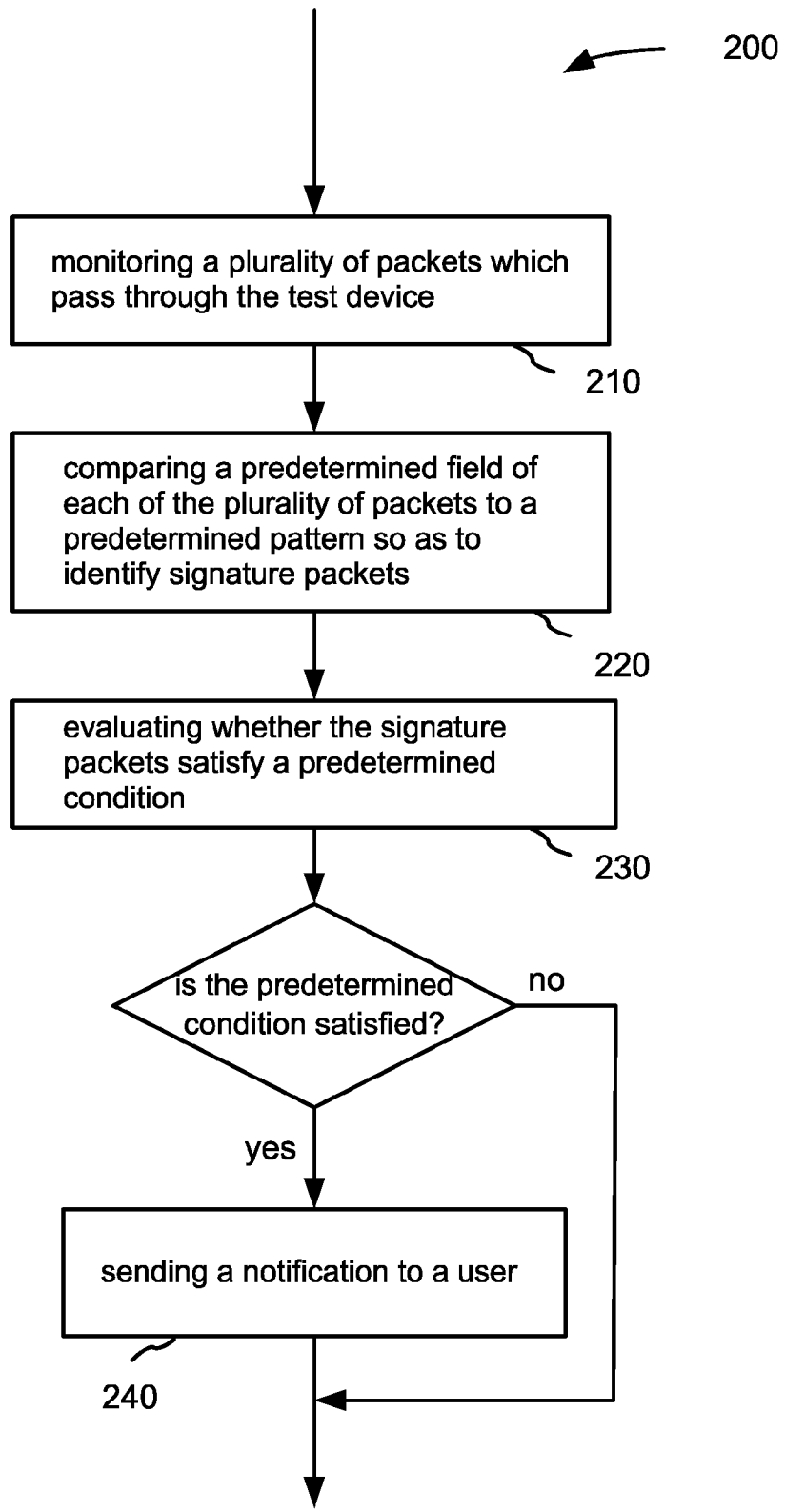
FIG. 3 is a flow chart of a method of monitoring a network.

FIG. 3 presents a flow chart of a method for monitoring a network by sensor devices connected inline in the network 100, wherein the network includes a plurality of sensors each possibly having a sensor ID. The method may be implemented in the sensors 110, 120, 130, and others within the network 100; the sensors may provide information to the monitoring manager 150.

With reference to FIG. 3, the method 200, as performed at a particular sensor, includes a packet monitoring step 210, when the sensor receives a plurality of packets and forwards the packets to their destinations.

In a pattern identifying step 220, the sensor compares the values of one or more predefined fields in each packet to patterns stored in a non-transitory memory of the sensor memory. This way the sensor identifies signature packets. By way of example, packets with DHCP renewal requests may be used as signature packets, and such packets may be identified by comparing UDP port numbers to numbers 67 and 68 assigned for DHCP.

In a signature evaluating step 230, a predefined condition is evaluated on the basis of the signature packets. In the example with DHCP renewal requests, the predefined condition relates to the latency of the signature packets. Conventionally, a node sends DHCP renewal requests with predefined intervals, e.g. of 30 min or longer, and the absence of a request from a particular node after a predefined threshold may indicate a problem. Accordingly, the predefined condition related to the signature packets which are DHCP renewal packets is whether time passed after receiving a latest of the signature packets or between two consecutive signature packets from a particular node is greater than the predefined threshold. In the 30 minute example, an alarm may be raised if no renewal request is received during a 32 minute interval.

If the predefined condition is satisfied, a notification is sent to a user, e.g. to a service provider, in a notification step 240. In case the condition is not satisfied, the notification is not sent.

In another example, the signature stream is formed of IP over MPLS over VLAN packets. The identification of such packets may include comparison of the EtherType field to a predefined value 0x8100 which indicates VLAN, 0x800 which indicates IP, and 0x8847 which indicates MPLS; the VLAN ID field may be compared to a predefined value related to a particular VLAN, the MPLS label may be compared to a predefined value related to a particular path, and the IP address may be compared to predefined value related to a particular user. Such packets have at least three Quality of Service (QoS) fields in MPLS, IP, and VLAN headers. Each of the three QoS fields is set and used in accordance with the particular protocol. However, the values in these QoS fields should match in the sense if one protocol provides a high level QoS, another protocol should not assign the lowest QoS level. The sensor may have a list of acceptable combinations of QoS values in all QoS fields. The predefined condition related to the signature packets is whether the combination of values in the QoS fields of a signature packet is not a permitted combination; if so, a notification should be sent to a user. The same rule may be used for signature packets which have two QoS fields, such as VLAN over IP which does not use MPLS.

The method 200 may be implemented in software in the form of a non-transitory computer-readable medium which includes computer program instructions that cause a computer system (e.g. a sensor) to execute the method.

The method 200, described above with reference to FIG. 3 as implemented in a testing device (sensor), may also be implemented in a distributed monitoring system. By way of example, the packet monitoring step 210 performed at a sensor may include copying the plurality of packets to the monitoring manager 150 (FIG. 1). The remaining steps, such as the pattern identifying step 220, the signature evaluating step 230, and the notification step 240, are then performed at the monitoring manager 150, which itself may be a distributed system and includes a non-transitory memory for storing the predefined pattern(s).

In another implementation of the method 200, the pattern identifying step 220 may be performed at the sensor 104 and the resulting signature packets may be forwarded to the monitoring manager 150 (FIG. 1). In comparison to the above example, forwarding only signature packets would reduce the traffic between the sensors and the manager 150.

The method 200 may be implemented in a system which includes at least two sensors and a monitoring manager. Each of the sensors is programmed to capture a plurality of packets passing therethrough. The monitoring manager has a tangible memory with computer instructions stored therein, and a processor for executing the computer instructions and causing the monitoring manager at least to send a notification to a user. The system is programmed to (a) compare a predefined field of each of the plurality of packets to a predefined pattern so as to identify signature packets, (b) evaluate whether the signature packets satisfy a predefined condition, and, (c) send the notification if the predefined condition is satisfied. The sensors may be programmed to perform steps (a) and (b), or the monitoring manager may be programmed to perform steps (a) and (b), or the sensors may be programmed to perform step (a) and the monitoring manager—to perform step (b), wherein the predefined pattern is stored in the tangible memory of the sensors or monitoring manager.

A person skilled in the art would appreciate that packets forwarded from the sensor 104 to the monitoring manager 150 during the monitoring step 210 or pattern identifying step 220 are copies of the packets received at the sensor 104, whereas the original packets are forwarded to the destination device 102 (FIG. 2), and the copies sent to the monitoring manager 150 may be encapsulated as disclosed in U.S. Patent Application No. 20110305149, and the encapsulation may include a timestamp which indicates the time when the packet was received at the sensor.

In another example, the method is used as part of active testing when another test device injects a stream of packets each having a predefined pattern in the payload of the packet, known to the sensor or the monitoring manager 150, to be used as the predefined pattern in order to recognize the packets in the pattern identifying step 220. The test packets also may include a sequence number in the payload of a packet.

A variety of business rules and predefined conditions may be employed in the signature evaluation step 230. In one embodiment, the sensor or the monitoring manager counts a number of out of sequence signature packets and, if the number of signature packets which are out of order is above a predefined threshold.

In another embodiment, the monitoring system counts a number of signature packets identified at a first sensor and a number of signature packets identified at a second sensor, wherein the first and second sensors are along the path of the injected traffic. When a difference between the two counts is above a predefined threshold, the system notifies the user; in this case the signature evaluation step should be performed at the monitoring manager 150 because the evaluation requires data from two sensors.

In yet another embodiment, the monitoring manager 150 receives signature packets from the two sensors, and for each packet compares timestamps indicating the time when the packet was captured by the sensors. The evaluating step 230 includes determining whether a delay between receiving one of the signature packets at the two test devices is above a predefined threshold. If the delay is above the predefined threshold value, the user is notified. Alternatively, the user is notified if a number of packets with the delay above the threshold is greater than a predefined number.

The aforedescribed method may utilize two signatures. The signature packets may be identified using a same predefined pattern at different sensors, as described above in the example of the injected test traffic captured at several sensors. When the signature packets are identified by comparing fields of received packets to a predefined pattern, the matching (identified) packets are sent to the monitoring manager for evaluation. Alternatively, packets forming two or more signatures may be identified at a same sensor but using different predefined patterns. By way of example, Network reroute of traffic (signature A)+Quality of service bit (signature B)+Measure of out of sequence packets (signature C). In this example, the three subsets of signature packets, or any two subsets together, may be used for evaluating the traffic signature and notifying a service provider that video may be pixelating on their CDN network. The predefined condition may be as follows: a user is notified if within a predefined time interval a number of reroute packets is above a first predefined threshold, a number of packets with QoS discrepancies is above a second predefined threshold, and a number of out of sequence packets is above of a third predefined threshold. Using the combined signature formed of two or more pluralities of packets identified using different patterns allows setting the thresholds at lower levels in comparison to the case when only reroute packets or only QoS discrepancies are used for identifying a potential problem because which affect the quality of real time services such as voice and video.

In one embodiment, the step of evaluating may include determining whether a number of the signature packets received within a predefined time interval is below a predefined threshold.

The rules used in the signature evaluating step 230 may be implemented as a series of instruction for processing collected signature packets. The instructions may be stored in the memory of the sensors or the monitoring manager. Alternatively the instructions may be implemented in firmware, ASIC, and/or FPGA.

Figure 4:
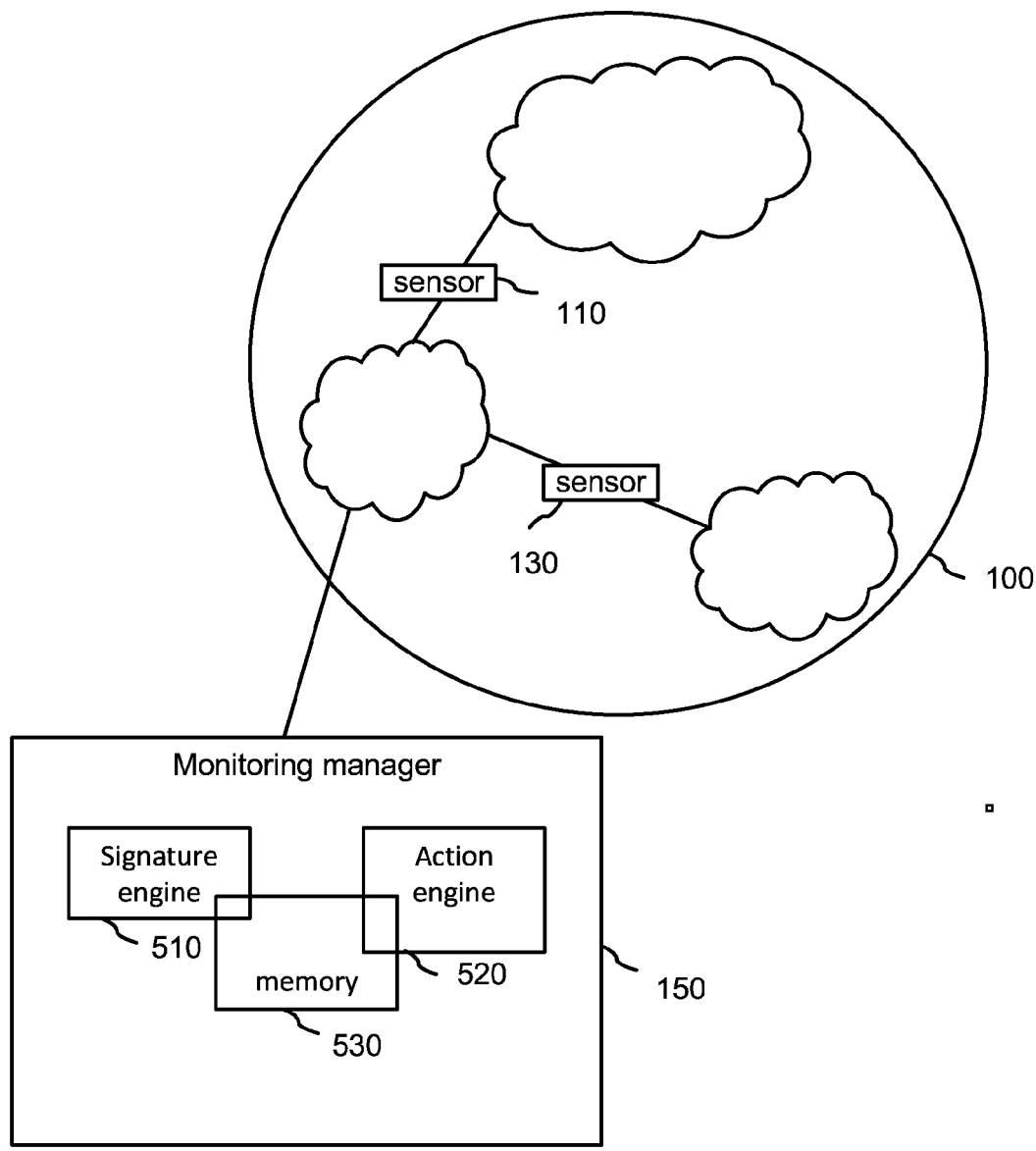
FIG. 4 is a schematic diagram of a system implementing the method of monitoring a network.

With reference to FIG. 4, a monitoring system which implements the aforedescribed method may include a plurality of probes (sensors) such as the devices 110 and 130 connected inline in the network 100; the sensors allow signatures to be captured, at least by performing the monitoring step 210 (FIG. 3). The system may further include a signature engine 510 which may be part of the monitoring manager 150. The probes collect certain information from the network; this information is then run against a set of rules at the signature engine 510 which can provide information to another part of the monitoring manager—an action engine 520.

By way of example, a signature may be formed of DHCP packets that are transit in the network. This DHCP signature is collected by a probe and then sent to the signature engine. Once this signature is received, a set or series of rules are used to extract certain information from the signature, for example IP addresses and Option fields may be obtained. Once the information is extracted, it is used to drive a certain action, e.g. to alarm a user. In the DHCP example, when certain information is or is not present in the signature an alarm, trigger, etc. is sent to a different application such as SNMP Trap, wherein the application acts as a user of the notification sent by the system.

Accordingly, the system information which governs collecting signatures—in the form of predefined patterns and the knowledge in which fields these patterns should be present. The information may be stored in memory 530. The system has also stored the rules and actions to take per each signature type. The monitoring engine 150 may be a distributed system, as well as its components including the memory 530.

A signature is collected based on a predefined filter for a certain pattern in the network, e.g. a protocol of X type is filtered for by a probe. Once this signature is captured in the network and then provided to the signature engine, a set of rules are then applied so as to action the signature. For example, the probes may be configured to filter for a packet that contains a DHCP message; once this signature is collected, it then is processed against a set of rules. A rule is a set of instructions that are used to process a signature, set of signatures or additional input to be used in conjunction with a signature. By way of example, if a message does not contain a certain field, then a rule is used to trigger an event (actions) into a service provider's management system. Signatures and rules can be used in conjunction to provide information to the action engine. In the example, the action may be an alarm sent to another network management system.

Each rule is specific to a signature, or plurality of signatures, or one or more signatures and a time dependency. For the example, for the DHCP signature the following rule may be applied: if a certain DHCP message type is not received during a certain time interval then an action is triggered.

In one example related to DHCP protocol, packets compliant with User Datagram Protocol (UDP) are collected form certain locations within the network. The UDP packets are then parsed at the Signature Engine, and data types are categorized per each protocol module; in particular, a plurality of signature DHCP packets are identified. Once the data is collected and parsed, a rule is applied to the data. By way of example, pseudo code for the rule may be as follows:

```
If DHCP content contains a value of "X"
then
    if time is equal to or less than "Y"
    then
    return "no issue"
    else
    if time is greater than "Z"
    return "issue + error."
```

Once an issue and/or error is received then the action engine is utilized In this case, the action engine will send a message containing the "issue+error" message to a log file which represents a user.

Figure 5:
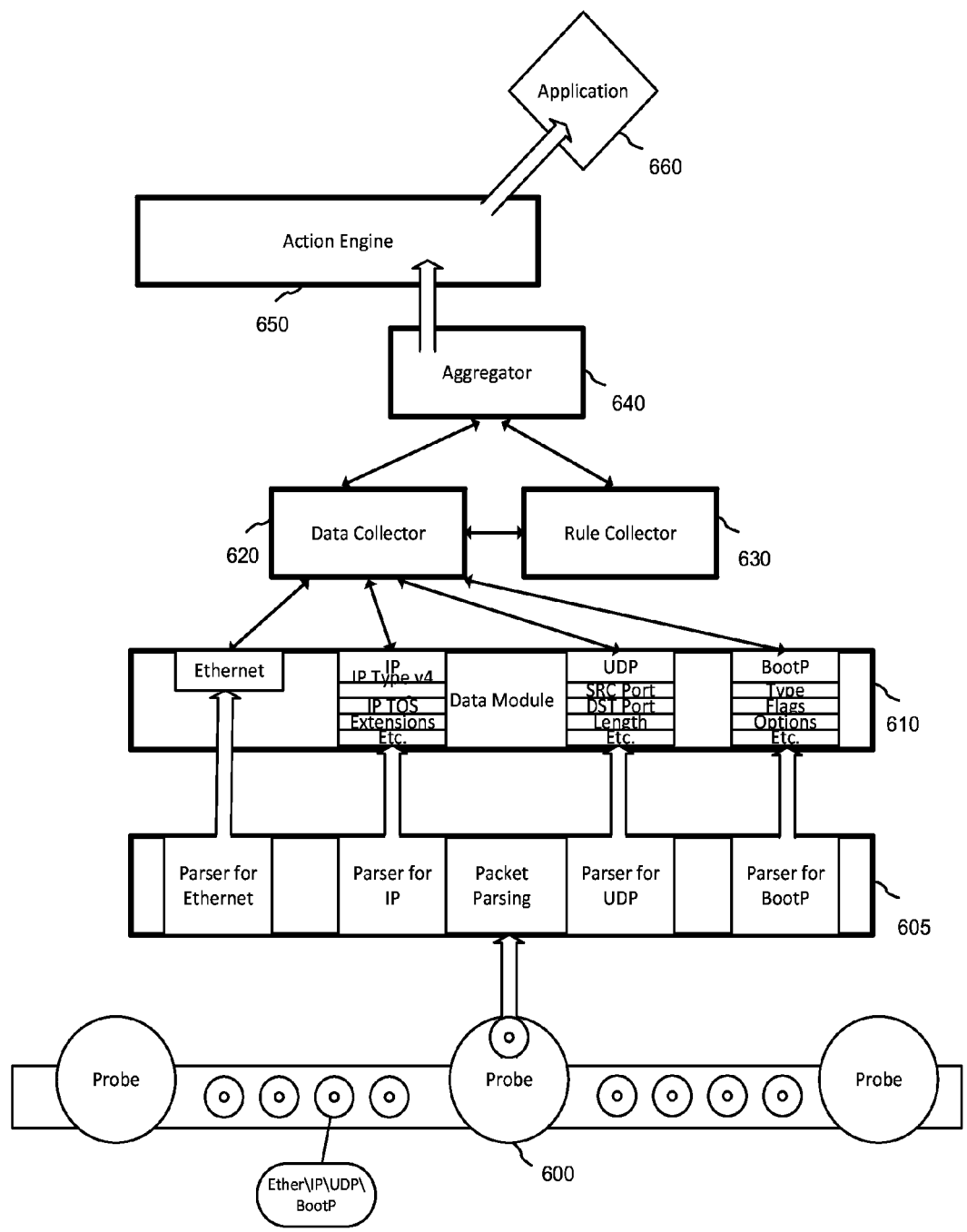
FIG. 5 is a is a schematic diagram of a system implementing the method of monitoring a network; and,
FIG. 6 is a schematic diagram of a sensor.

With reference to FIG. 5, the system implementing the aforedescribed method includes a plurality of sensors (probes) 600 and a monitoring manager 150 (FIG. 4). The monitoring manager 150 may include a parser 605, a data module 610, a data collector 620, a rule collector 630, an aggregator 640, and an action engine 650.

The data module 610 is protocol aware. When a probe collects packets passing through the probe, the fields and patterns which define a signature are known at the data module. The signature packets are parsed and placed into 'buckets' so as to allow the data collector 620 to collect the applicable data fields. The data collector 620 is collecting information from the data module 610 based on the rules that are being enforced for certain actions. The rule collector 630 is the location at which the rules are kept, configured, etc.

The aggregator 640 is a component that extracts information that is particular to an event; for example, when a rule is triggered, data associated with that rule is extracted. This information may be used for the action; for example, the notification that a DHCP delay has exceeded the threshold may contain data including information of the device possibly went offline and/or the value of the delay. The action engine 650 sends a notification (action) to a user to whom the aforedescribed method provides information about the network; the user may be an application 660.

Accordingly, FIG. 5 represents a signature collecting system comprising: a probe for capturing a signature packet from a network data flow; a parser for extracting data from the signature packet; a signature engine for applying a predefined rule to the data; and an action engine for executing an action in response to the rule.

Figure 6:
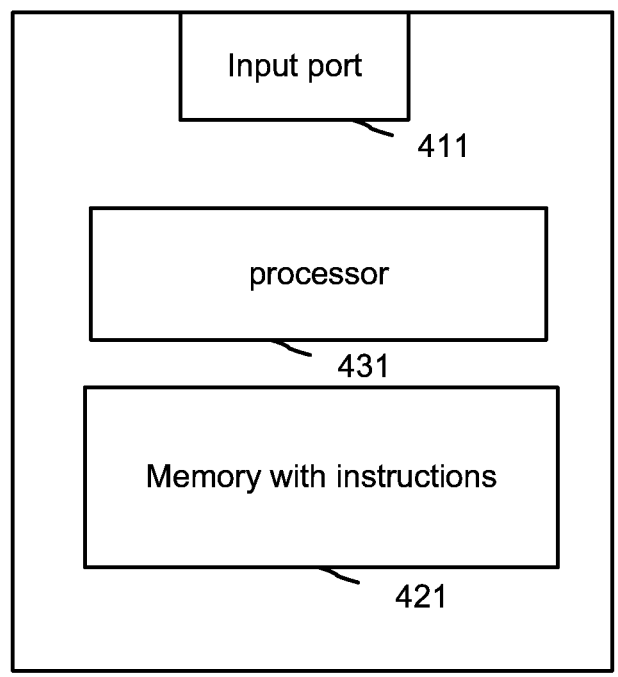

With reference to FIG. 6, the sensors 600 (FIG. 5), such as sensors 110, 120, 130 (FIG. 1), and 104 (FIG. 2), may include: an input port 411 for receiving a stream of packets; a tangible memory 421 with computer instructions stored therein; and, a processor 431 for executing the computer instructions and causing the sensor to forward the received packets to their destination 102 (FIG. 2) and copy the packets to the monitoring manager 150 (FIG. 1). The sensors may include patterns for identifying signature packets, and instructions which cause the processor to identify the signature packets and forward them to the manager 150. Furthermore, the sensor may include rules for evaluating the signatures and instructions which cause the processor to do the evaluation. In other words, the functionality of the parser 605 and data module 610 may be implemented in the sensor and/or in the monitoring manager 150.

The components of the test device may be implemented in a combination of software and hardware such as an Application Specific Integrated Circuit (ASIC), Field programmable Gate Array (FPGA), network processor, system on a chip such as an FPGA with integrated ARM or micro processor, Complex Programmable Logic Device (CPLD), Erasable programmable logic device (EPLD), Simple programmable logic device (SPLD), or macrocell array. The memory components 421 (FIG. 6) and 530 (FIG. 4) may be any non-volatile memory such as an Electrically Erasable Programmable Read-Only Memory EEPROM, flash memory, Ferroelectric RAM, application-specific integrated circuit (ASIC), and/or a volatile memory such as a DRAM, etc., or any writable memory known and unknown, or combination thereof.

In the description above, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

We claim:

1. A method of monitoring a network with a test device connected to the network, comprising: monitoring a plurality of packets which pass through the test device, comparing a predefined field of each of the plurality of packets to a predefined pattern so as to identify signature packets, evaluating whether the signature packets satisfy a predefined condition, and, when the predefined condition is satisfied, sending a notification to a user, wherein each of the signature packets includes at least two QoS fields, and the evaluating step comprises determining whether a combination of values in the QoS fields is a permitted combination.

2. The method as defined in claim 1 wherein the signature packets are MPLS packets.

3. The method as defined in claim 1 wherein the signature packets are VLAN packets.

4. The method as defined in claim 3 wherein the signature packets are MPLS/VLAN packets.

5. A method of monitoring a network with a test device connected to the network, comprising: monitoring a plurality of packets which pass through the test device, comparing a predefined field of each of the plurality of packets to a predefined pattern so as to identify signature packets, evaluating whether the signature packets satisfy a predefined condition, and, when the predefined condition is satisfied, sending a notification to a user, wherein the step of evaluating comprises determining whether a difference between a number of the signature packets identified at the test device and a number of signature packets identified at another test device is above a predefined threshold.

6. A method of monitoring a network with a test device connected to the network, comprising: monitoring a plurality of packets which pass through the test device, comparing a predefined field of each of the plurality of packets to a predefined pattern so as to identify signature packets, evaluating whether the signature packets satisfy a predefined condition, and, when the predefined condition is satisfied, sending a notification to a user, wherein the step of evaluating comprises determining whether a delay between receiving one of the signature packets at the test device and at another test device is above a predefined threshold.

* * * * *